United States Patent [19]

Benson et al.

[11] 4,184,692
[45] Jan. 22, 1980

[54] MOTOR QUICK-CHANGE CHUCK SYSTEM FOR TOOL HAVING CYLINDRICALLY SHAPED ADAPTER PORTION

[75] Inventors: Richard L. Benson, Mercer Island; Horace E. Hill, Renton; Mark S. Soderberg, Bellevue, all of Wash.

[73] Assignee: The Boeing Company, Seattle, Wash.

[21] Appl. No.: 932,593

[22] Filed: Aug. 8, 1978

Related U.S. Application Data

[63] Continuation of Ser. No. 799,406, May 23, 1977, abandoned.

[51] Int. Cl.² .............................................. B23B 31/22
[52] U.S. Cl. ........................................ 279/75; 408/226
[58] Field of Search ................... 279/1 B, 71, 72, 75, 279/81, 22, 30; 408/239 R, 239 A, 226

[56] References Cited

U.S. PATENT DOCUMENTS

| | | | |
|---|---|---|---|
| 1,602,708 | 10/1926 | Russell | 279/75 |
| 2,835,497 | 5/1958 | Suhner | 279/75 |
| 3,251,605 | 5/1966 | Ondeck | 279/82 |
| 3,583,715 | 6/1971 | Jahrl | 279/75 |
| 3,788,658 | 1/1974 | Benjamin et al. | 279/75 |
| 4,002,348 | 1/1977 | Johnson | 297/75 |

FOREIGN PATENT DOCUMENTS

| | | | |
|---|---|---|---|
| 116889 | 7/1946 | Sweden | 279/30 |
| 10973 | of 1908 | United Kingdom | 408/226 |

Primary Examiner—Leonidas Vlachos
Attorney, Agent, or Firm—Conrad O. Gardner; B. A. Donahue

[57] ABSTRACT

A quick-change drill chuck adapted for positioning ball elements within dimples circumferentially disposed about the central axis of the adapter portion of a tool, such as a drill, to drive the drill. A first quick-change drill chuck utilizes an axially spring-biased collar, while a further quick-change drill chuck incorporates a rotary spring-biased collar for manipulating the ball elements into and out of the dimples.

1 Claim, 12 Drawing Figures

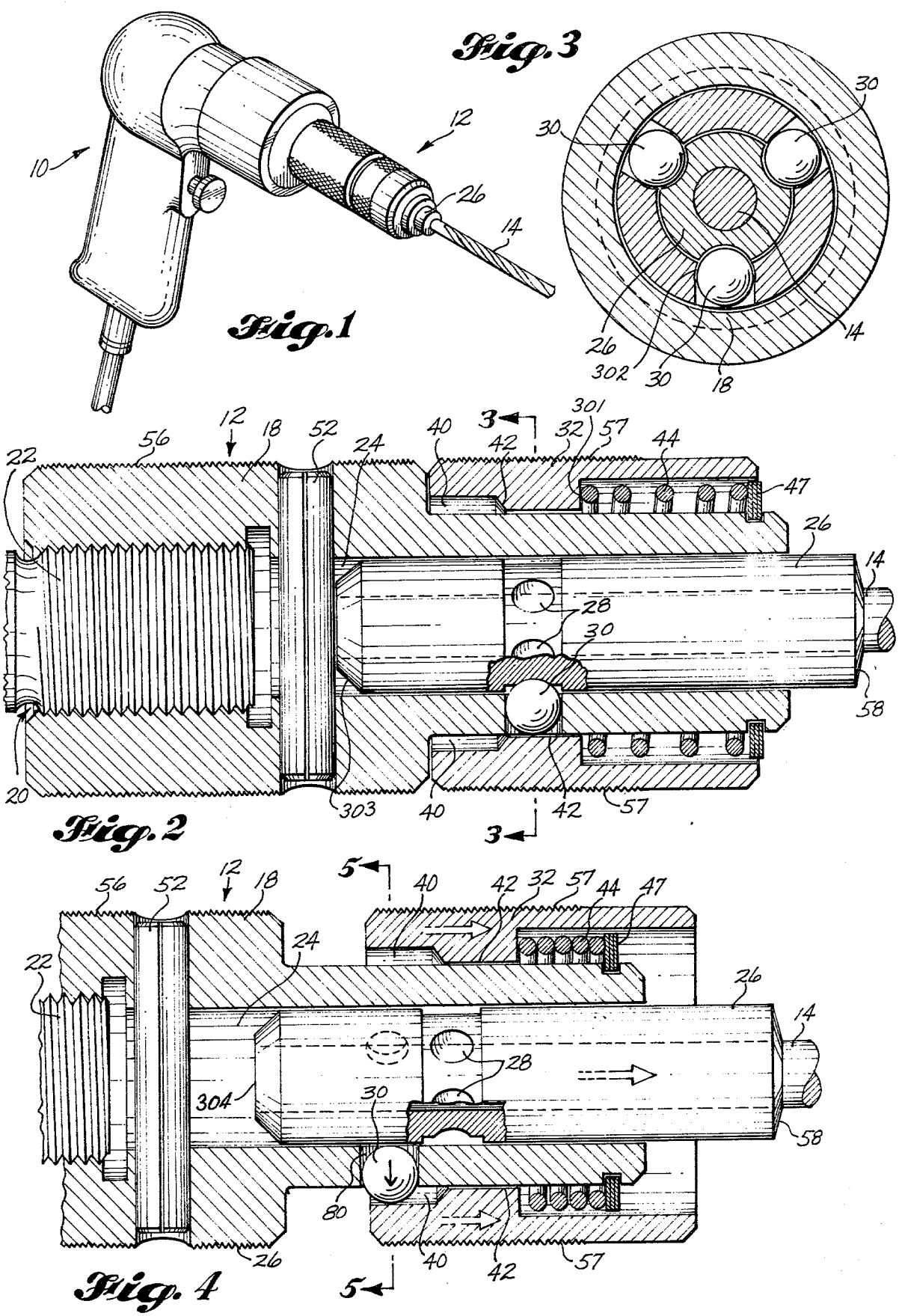

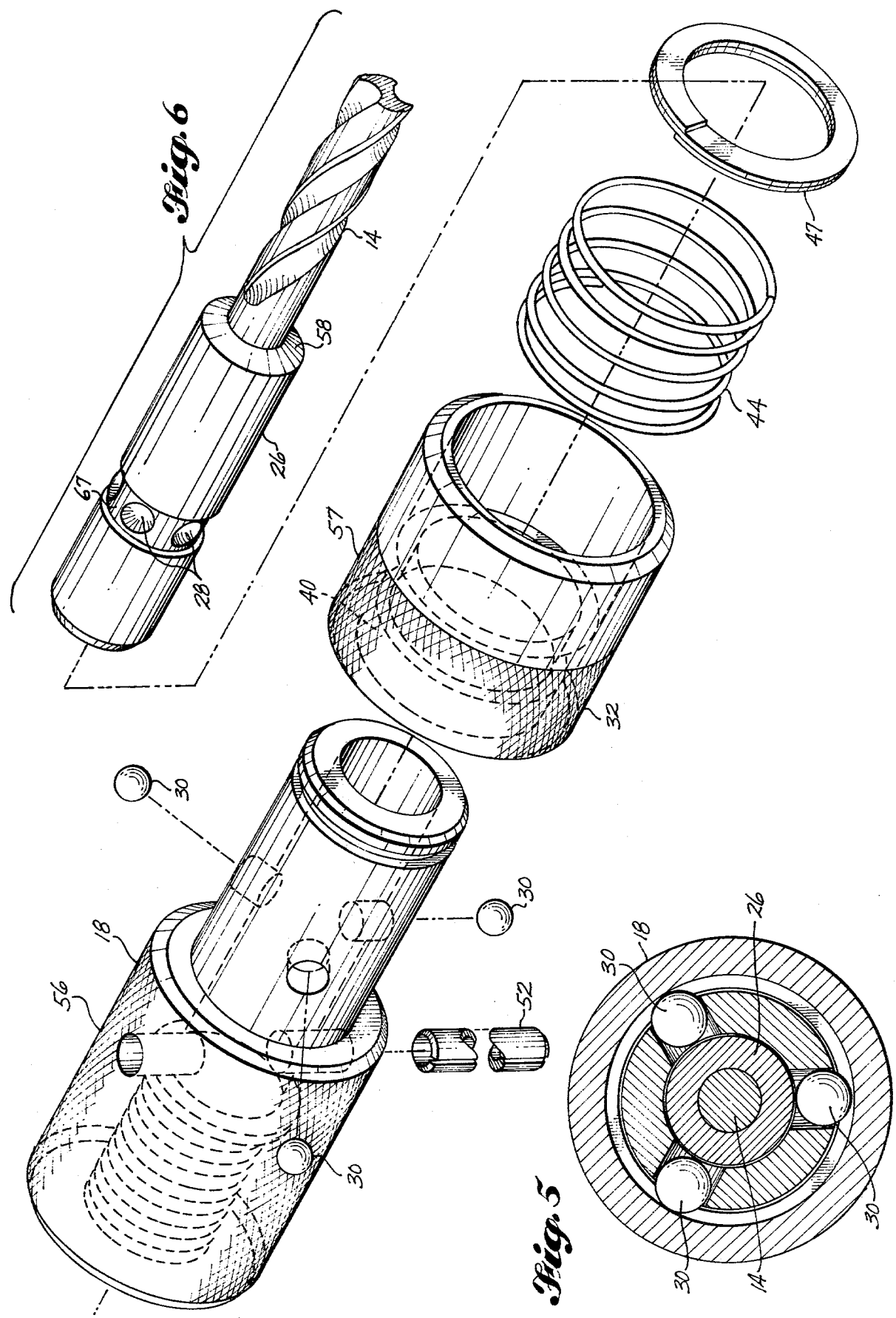

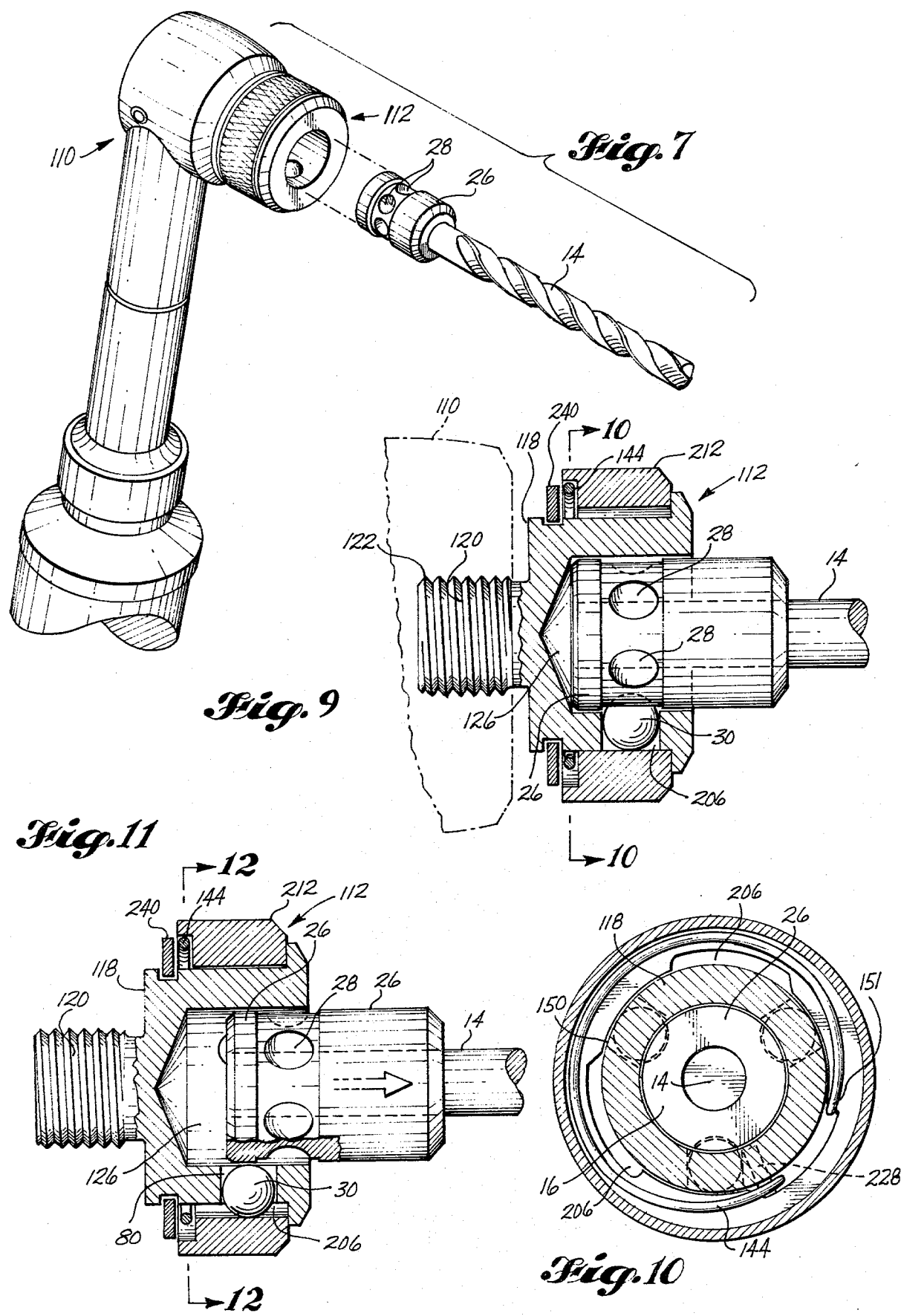

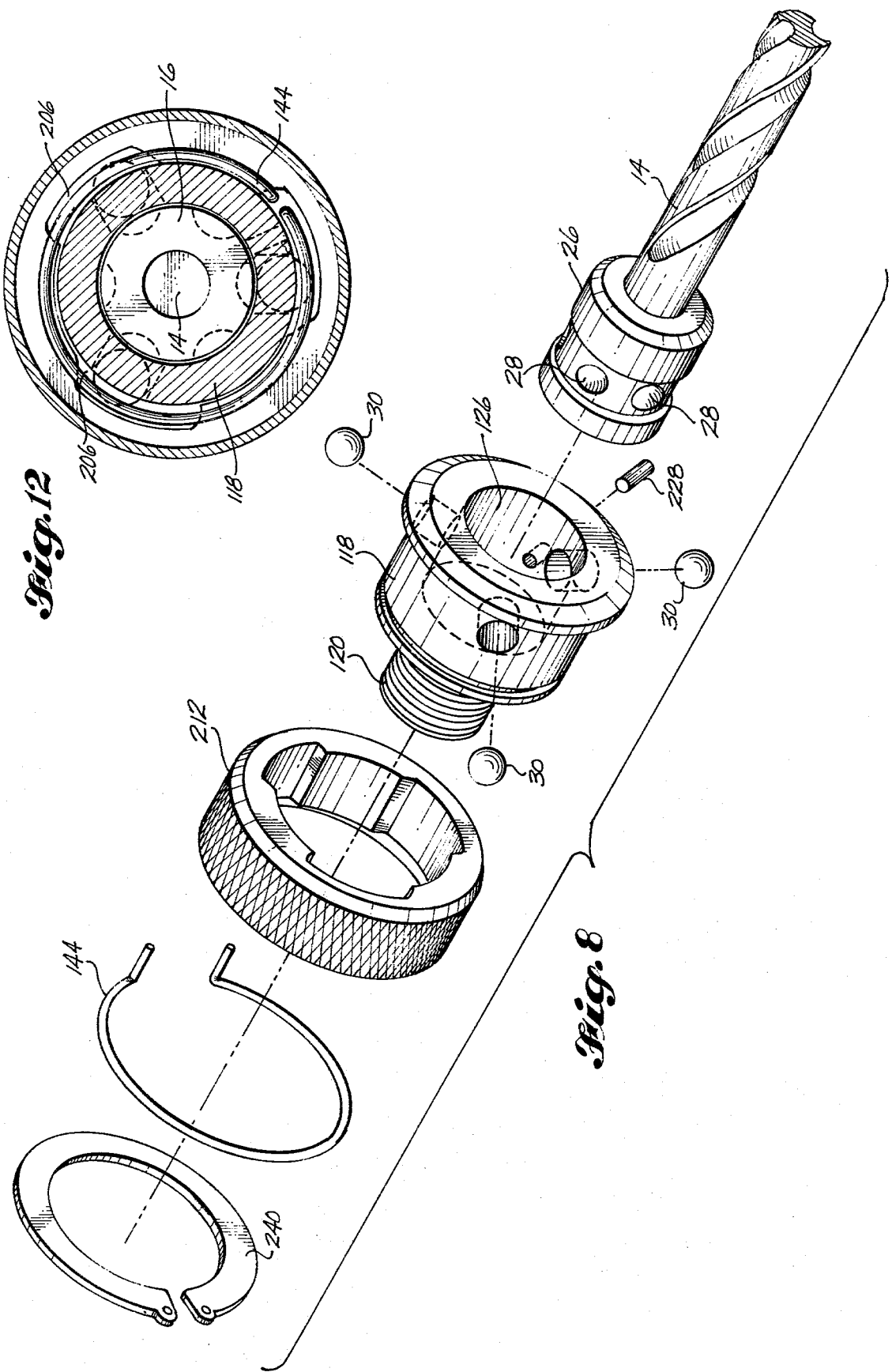

MOTOR QUICK-CHANGE CHUCK SYSTEM FOR TOOL HAVING CYLINDRICALLY SHAPED ADAPTER PORTION

This is a continuation of application Ser. No. 799,406, filed May 23, 1977 and now abandoned.

This invention relates to tool-holding chucks and, more particularly, to chucks for holding tools having an adapter portion, such as drills.

Straight chucks and adapters are known in the art as exemplified in U.S. Pat. No. 1,124,981, which may be contrasted with the present invention wherein three balls and six detents in the adapter are utilized, thereby requiring an average rotation of 30° for engagement. In U.S. Pat. No. 1,124,981 one or two balls with corresponding number of detents are provided, whereby 180° or 360° rotation could be required to engage. Further in contrast with the configuration of U.S. Pat. No. 1,124,981, the present invention utilizes recesses in the form of dimples which are spherically shaped, thereby reducing angular free play, instead of recesses as shown in the aforementioned U.S. Patent, which are elongated and therefore more difficult to generate. In accordance with a first embodiment, a collar in the chuck is raised in the direction of drilling so that the drill cannot be dislodged when bumping the work piece, whereas the collar in the referenced chuck moves in the opposite direction. The adapter in accordance with the present invention is a low-cost integral throw-away portion of tool, e.g., drill, whereas the referenced adapter contains a tapered hole and is therefore more expensive, being added temporarily to the drill. The present chuck configuration is threaded for utilization in hand-held motors, whereas the referenced chuck utilizes morse taper adapted for large stationary machines.

A further reference of interest in the prior art illustrative of tool-holding chucks and adapters, U.S. Pat. No. 3,708,178, utilizes a conical adapter, in contrast to the present cylindrical adapter, which further utilizes a drill tool having an integral adapter portion. The adapter of U.S. Pat. No. 3,708,178 is threaded to the drill tool and also utilizes angled elongated recesses in the adapter to lock in the drilling machine, thereby requiring some initial rotation until lock-up and requiring further rotation for drill retraction. In accordance with an embodiment hereinafter described, the stop for the collar is provided in the chuck and ball reliefs are utilized for indexing, the present collar also serving as the spring holder, thereby permitting one pin to serve all functions. The chuck shown in referenced U.S. Pat. No. 3,708,178 is of increased complexity compared to the chuck in accordance with an embodiment of the present invention, in that two stops are provided in the collar to stop rotation and two separate stops for the spring. In contrast with the prior art extension spring, in an embodiment hereinafter described a single wind-up spring is utilized in the chuck.

It is accordingly an object to provide a recess over dimples in the adapter portion opposite the working end having a cutting surface of a tool for clearing and providing movement of foreign material.

It is another object to provide roll pin depth stop means for allowing foreign material to clear the bottom of a drilled hole.

It is a further object to provide a chuck having a collar knurled 50% to avoid part damage resulting from chuck contact with the work piece.

It is yet another object to provide a tool having a cylindrically shaped adapter portion utilizing six circumferentially disposed dimples, thereby requiring less than 60° and an average of 30° rotation for chuck engagement and further providing automatic engagement of adapter portion in the case of misalignment thereof.

It is yet a further object to provide chuck means for hand-held motors wherein the chuck means includes a three-ball configuration, thereby minimizing side loads, which balls are trapped and not ramped, further preventing collar wedge and disengagement difficulty with respect to collars associated with the chuck.

The invention, together with other objects and features thereof, will be more clearly understood when the following description is read in connection with the accompanying drawings in which:

FIG. 1 is a perspective view of a hand-held portable motor having a spindle coaxial with the motor central axis, showing a chuck having an axially spring-biased collar and tool having an adapter portion coaxially disposed in the chuck;

FIG. 2 is a vertical cross section of the chuck and tool shown in FIG. 1;

FIG. 3 is a cross section of the chuck and tool showing adapter portion thereof taken along line 3—3 of FIG. 2;

FIG. 4 is a cross section similar to FIG. 2 of the chuck and adapter portion of the tool showing the adapter portion being withdrawn;

FIG. 5 is a cross section taken along line 5—5 of FIG. 4 showing ball elements of the chuck shown in FIGS. 1 to 4 in an unlocked condition;

FIG. 6 is an exploded perspective view showing in more detail the chuck assembly and tool having an adapter portion of FIG. 1;

FIG. 7 is a view in perspective of a hand-held portable motor having a spindle angularly displaced 90° with respect to the motor control axis, further showing a chuck having a rotary spring-biased collar and tool having an adapter portion coaxially disposed in the chuck;

FIG. 8 is an exploded perspective of the tool and chuck of FIG. 7;

FIG. 9 is a vertical cross section of chuck and adapter portion of the tool shown in FIG. 7;

FIG. 10 is a cross-sectional view taken along the lines 4—4 of chuck and adapter portion shown in FIG. 9;

FIG. 11 is a cross-sectional view similar to FIG. 9, however, showing the adapter portion being withdrawn;

FIG. 12 is a cross-sectional view of chuck and adapter portion of FIG. 11 taken along the lines 6—6.

Turning now to FIG. 1, it will be noted that hand-held portable motor 10 is provided with a chuck 12 for retaining and driving a tool, viz., a drill bit 14 having an adapter portion 16 concentrically disposed within chuck 12. FIG. 2 is a vertical cross section of the chuck 12 and tool 14 of FIG. 1 showing in more detail the parts of the present system. Chuck 12 comprises a generally cylindrically shaped body member 18 having a hollow first end portion 20. Concentrically disposed hollow first end portion 20 is threaded on the inner wall surface thereof to accept the mating threaded spindle 22 of portable motor 10.

Hollow first end portion 20 is concentric with hollow end portion 24 at the other end of cylindrically shaped body member 18 of chuck 12 which accepts adapter portion 26 of tool 14, thereby minimizing tool 14 run-out tendencies. More detailed discussion of tool 14 configuration is hereinafter discussed in connected with FIG. 6. However, it should be noted that cylindrically shaped adapter portion 26 includes six (6) spherically shaped dimples 28 equiangularly disposed about the central axis of tool 14 around the outer surface of adapter portion 26. Also it should be further noted that three balls 30 (more easily seen in FIG. 3) are controlled by chuck collar member 32 and locked in dimples 28 (as shown in FIG. 2) to permit tool 14 retention, or withdrawn from dimples 28 (as seen in FIG. 4) to permit tool 14 withdrawal.

In the chuck embodiment of FIGS. 1 to 5, balls 30 are disengaged for removing adapter portion 26 of tool 14 by raising spring-loaded collar member 32 of chuck 12, thereby permitting balls 30 to move outward radially (with respect to the chuck 12 central axis) into recesses 40 formed in the inner wall surface of collar member 32 adjacent radially extending shoulder portions 42 utilized to lock balls 30 in dimples 28. When collar member 32 is released, axially biasing spirally wound spring member 44 preloaded in position by retaining ring 47 will drive collar member 32 downward when dimples 28 in adapter portion 26 are aligned with balls 30 of chuck 12, thereby trapping balls 30 in dimples 28 of adapter portion 26. It will be noted from FIG. 4 that collar member 32 must be moved towards the work piece beyond the end of tool 14 for tool removal, thus accidental disengagement, which might occur when the work piece is contacted, is prevented.

When adapter portion 26 is installed by insertion into chuck 12 within body member 18, proper depth for engagement is realized upon contact with roll pin depth stop 52. Adapter portion 26 is formed of hardened steel, e.g., 1020 steel case-hardened, 1095 through-hardened, to minimize dimple 28 brinelling and also for the purpose of minimizing damage to the outside diameter thereof that might occur in handling or storage. A slip fit is provided between the outside diameter of adapter portion 26 and the inner bore 24 diameter, e.g., 0.0005 to 0.0015 inches clearance between these surfaces. Cylindrically shaped body member 18 has an outer knurled surface 56, thereby providing sufficient roughening to allow hand rotation of body member 18 to free tool 14 in the event of hanging-up of tool 14 in the work piece. Collar member 32 is also provided with a knurled outer surface 27 rearward of the work piece. However, it is left smooth at the forward region to minimize damage to the work piece that might occur upon work contact. A disassembled exploded view is shown in FIG. 6 of the chuck 12 and tool 14 with adapter portion 26, which adapter portion 26 has the front surface 58 thereof beveled to prevent work damage in the event of contact therewith. A circumferential recess 67 is provided in adapter portion 26 surrounding dimples 28 to clear debris and permit some deformation of the dimples without preventing insertion in the chuck.

Installation and removal of adapter 26 is accomplished in the following manner: Collar 32 is gripped at knurled portion 56 and raised, thus allowing the three balls 30 to be disengaged from the adapter detents 28 by moving outward radially into the collar recess 40. Tool 14 and adapter 26 are now free for removal of adapter 26. During installation adapter 26 is pushed into the bore 24 with the collar 32 still raised, until roll pin depth stop 52 is reached. Now collar 32 is released and compression spring 44 will automatically snap the collar 32 closed and trap the balls 30 between surface 42 and detents 28 upon rotation of adapter 26 to align detents 28 with ball sockets 80.

Proceeding now to FIG. 7, it will be seen that a suitable hand-held angle motor 110 is utilized instead of a straight drive motor 10 as shown in FIG. 1, which motor 110 is provided with a chuck 112 having a rotary spring-biased collar 212 (as seen in FIGS. 9 and 11) to drive tool 14, viz., a drill bit having an adapter portion 16 of the same type shown in connection with the previous description wherein the same numerals were utilized and which description may be referred to for further understanding thereof. Chuck 112, shown in more detail in a cross-sectional view thereof in FIGS. 9 and 11, includes a threaded first end portion 120 that receives spindle 122 of angle motor 110. Threaded first end portion 120 is concentric with bore 126 in the other end of body member 118, which bore 126 in a slip fit accepts adapter portion 26 of tool 14, thereby minimizing tool 14 run-out tendencies. In a comparison of FIGS. 9 and 11 hereinafter described with respect to FIGS. 2 and 4 earlier described, it will be observed that three (3) balls 30 are also utilized in chuck 112 as were utilized in chuck 12 and that balls 30 are also locked in the six (6) spherically shaped dimples 28 to drive tool 14, albeit in a different manner as hereinafter described, by chuck 112. Chuck 112 utilizes a rotary spring-biased collar member 212, biased by single-turn spring 144, which collar member 212 upon rotation permits removal of or insertion of adapter portion 26 of tool 14. The aforementioned rotation of collar member 212 permits balls 30 to move outwardly in a radial direction with respect to the central axis of adapter 112 into recesses 206. When collar member 212 is released, wind-up single-turn spring 144 (as readily seen in FIG. 10) returns collar member 212 to the engaged position against fixed stopping member 228 which is pressed into body member 118, thereby trapping balls 30 between dimples 28 and raised areas 150.

It should be noted that collar member 212 of chuck 112 is rotated in the direction of tool 14 rotation for removal of adapter portion 26, thereby preventing accidental disengagement upon work contact by adapter portion 26. Stopping member 228, which collar member 212 seats against, provides the further function of providing anchoring means for one end of spring 114 (as readily observed in FIG. 10), while the other end of spring 114 is hooked over one of the spline-like recesses 206 in body member 118. Overrotation of wind-up spring 114 is not possible, since the recess 206 in collar member 212 reaches stopping member 228 before spring 114 can be overwound. Collar member 212 is provided with a slip fit on chuck body member 118 and held in position by means of retaining ring 240.

It should be further noted that when collar 212 is rotated in the direction of drill rotation, spring 114 is wound up between pin 228 and recess 151, thereby allowing balls 30 to fall into recesses 206, which disengages balls 30 from the adapter dimples 28. When installing adapter 26 with collar 212 rotated, adapter 26 is simply pushed into bore 126 until the bottom is reached. Upon release of collar 212, collar 212 will automatically snap closed to fixed pin 228 when adapter dimples 28 are aligned with ball sockets 80, thereby providing positive engagement with balls 30 trapped between detents 28 and raised surfaces 150.

We claim:
1. In combination:
a tool having cylindrically shaped adapter portion;

a tool-holding chuck assembly having a generally cylindrically shaped body member, said generally cylindrically shaped body member having a hollow first end portion, said hollow first end portion having an inner wall surface threaded to accept the mating threaded spindle of a portable motor, said generally cylindrically shaped body member having a hollow second end portion concentrically disposed relative to said hollow first end portion for receiving said cylindrically shaped adapter portion in slip fit relationship therewith, said generally cylindrically shaped body member including a roll pin depth stop disposed between said hollow first end portion and said hollow second end portion for limiting the depth of engagement of said received cylindrically shaped adapter portion;

said cylindrically shaped tool adapter portion including an array consisting of six spherically shaped dimples circumferentially disposed in the outer surface of said cylindrically shaped adapter portion;

said tool-holding chuck assembly including three cylindrically shaped ball elements, a collar member (32) having an internal shoulder (301), a recess (40) formed in the inner wall surface thereof, a retaining ring (47), a spirally wound spring member (44) disposed between said retaining ring (47) and said internal shoulder (301), said collar member (32), retaining ring (47), and spirally wound spring member (44) coaxially disposed about the central axis of said tool-holding chuck assembly, said collar member (32) adapted to be moved axially for compressing spirally wound spring member (44) between said retaining ring (47) and said internal shoulder (301) thereby positioning said recess (40) for receiving said three cylindrically shaped ball elements to provide release of said cylindrically shaped adapter portion of said tool from said tool holding chuck assembly.

* * * * *